Sept. 24, 1957  J. BARCAFER  2,807,516
TELESCOPING MAP AND ARTICLE CARRYING TRAY
Filed May 12, 1955
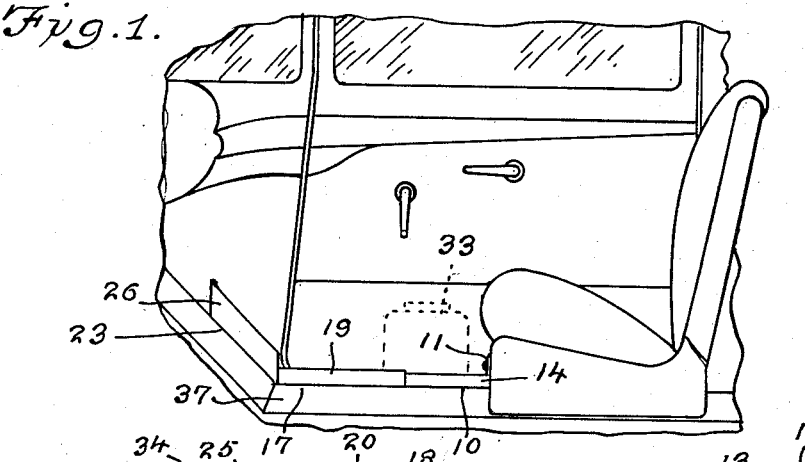
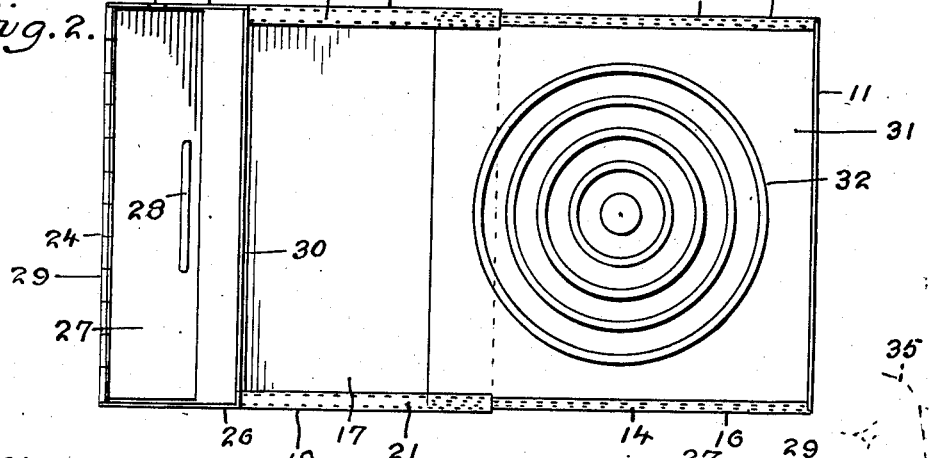
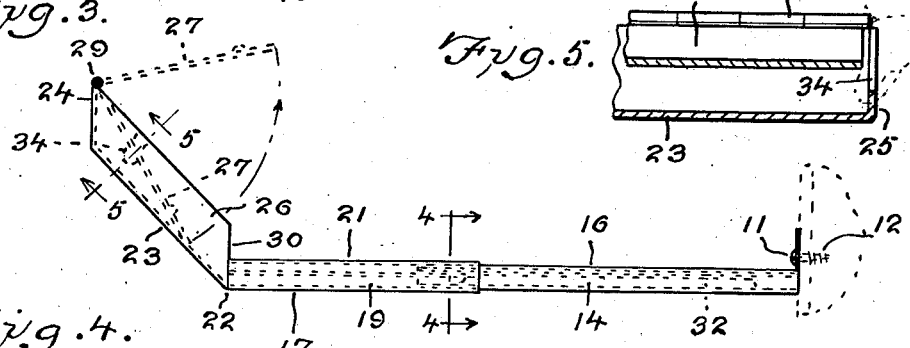
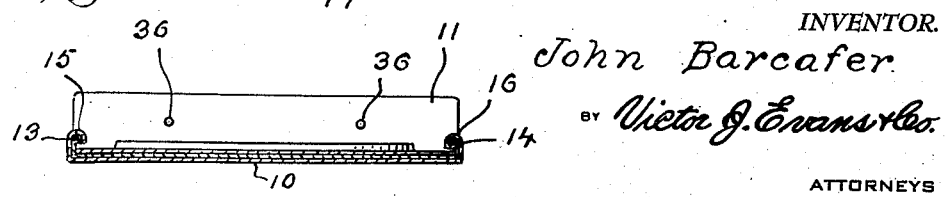
INVENTOR.
John Barcafer.
BY Victor J. Evans & Co.
ATTORNEYS

United States Patent Office 2,807,516
Patented Sept. 24, 1957

2,807,516

TELESCOPING MAP AND ARTICLE CARRYING TRAY

John Barcafer, Shattuck, Okla.

Application May 12, 1955, Serial No. 507,793

4 Claims. (Cl. 312—246)

This invention relates to devices for holding maps and other papers and also articles in motor vehicles, and in particular, a tray having a telescoping base adapted to be positioned on the ridge in the floor between the front seat and cowl for holding a thermos bottle or the like and an inclined section having a cover with a weight thereon for holding road maps and other papers and adapted to be positioned on the inclined section of the floor or cowl at the front of the vehicle.

The purpose of this invention is to provide a carrier for road maps, thermos jugs and other articles and devices whereby such devices are adapted to be retained in an orderly condition instead of being stacked in the center of the front seat of a vehicle.

In motor vehicle travel it is customary to use road maps continuously and such maps are folded and stacked in the center section of the front seat of the vehicle with newspapers, thermos bottles, glasses, and other articles and wherein one or two maps may be placed in the glove compartment of the vehicle the glove compartment is often filled in traveling. With this thought in mind, this invention contemplates a carrier for road maps, newspapers, and other articles whereby the articles may be retained in a readily accessible position and at the same time in a substantially closed case.

The object of this invention is, therefore, to provide a carrier for articles used in traveling in a motor vehicle whereby such articles are retained in out of the way positions and at the same time are readily accessible.

Another object of the invention is to provide a carrier for road maps and other articles used in motor vehicle travel in which the carrier is adapted to be installed in the vehicle without changing parts of the vehicle and without interfering with comfort of occupants of the vehicle.

A further object of the invention is to provide a carrier for road maps, thermos jugs and other articles which is adapted to be positioned on the ridge in the center of the floor in front of the front seat of a motor vehicle in which the device is of a simple and economical construction.

With these and other objects and advantages in view, the invention embodies a base having a mounting flange with openings therein extended upwardly from one end and having side walls wtih rolled upper edges, a tray also having side walls slidably mounted on the base with the side walls thereof retained in position by the rolled upper edges of the side walls of the base and a case for road maps and the like extended upwardly at an angle from the forward end of the tray and having a hinged cover with a weight thereon for retaining road maps, newspapers, and other papers in an orderly condition therein.

Other features and advantages of the invention will appear from the following description, taken in connection with the drawing, wherein:

Figure 1 is a longitudinal section through the forward part of a motor vehicle with front and rear portions thereof broken away illustrating the use of the carrier or telescoping tray of this invention, the tray being positioned on the center ridge of the floor of the vehicle and between the front seat and cowl.

Figure 2 is a plan view of the improved telescoping tray.

Figure 3 is a side elevational view showing the tray with the flange at the end of the base secured to a metal plate at the forward edge of a front seat of a vehicle with screws and with a cover for a map case or compartment of the tray shown in an open position in broken lines.

Figure 4 is a cross section through the tray, taken on line 4—4 of Figure 3, the parts being shown on an enlarged scale.

Figure 5 is a section through the map carrying portion of the device, taken on line 5—5 of Figure 3, illustrating a method of raising the cover with the finger of an operator extended through a slot in one side of the map carrying section or case, the opposite side of the device being broken away and parts being shown on an enlarged scale.

Referring now to the drawing, wherein like reference characters denote corresponding parts, the improved map and article carrying telescoping tray of this invention includes a base 10 having a flange 11 with openings for screws 12 therein and having side walls 13 and 14 with rolls 15 and 16 formed on upper edges thereof, a tray 17 having side walls 18 and 19 with beads 20 and 21 on upper edges thereof positioned with the side walls and beads extended over the side walls 13 and 14 and rolls 15 and 16 of the base whereby the base telescopes in the tray, as shown in Figures 1 to 4.

The forward section of the tray extends upwardly from a point 22 providing a base 23 of a tray for maps and the like, and the base is provided with a front wall 24 and side walls 25 and 26. A cover 27 having a weight 28 thereon is secured to the upper edge of the front wall 24 with a hinge 29 and with the ends of the cover spaced inwardly from the side walls 25 and 26 the cover is free to swing downwardly into the map and newspaper carrying section of the device as indicated by the dotted lines in Figure 3. A dividing wall 30 is provided at the intersection of the tray 17 with the inclined base 23 for retaining maps in the inclined section.

The base 10 of the telescoping section of the tray is provided with a mat 31, the upper surface of which is provided with ridges 32 wherein with the mat formed of rubber or other suitable material a thermos jug, as indicated by the numeral 33, may be carried on the mat, as shown in Figure 1.

As illustrated in Figures 3 and 5, the side wall 25 of the map carrying section of the tray is provided with a slot 34 in which a finger, as indicated by the numeral 35, may be placed to raise the cover 27 when it is desired to remove or insert a map or the like in the compartment.

With the device installed, as illustrated in Figure 1, the flange 11 is secured to the metal flange at the forward edge of the base of the front seat with metal screws or bolts, as indicated by the numeral 12, the fastening devices being inserted through openings 36 in the flange 11 and with the base 10 anchored in position in this manner the extended part of the tray remains stationary upon the ridge that extends over the drive shaft of the vehicle, the ridge being indicated by the numeral 37. The device may, therefore, remain permanently in the vehicle and being positioned over the ridge it does not interfere with leg room in the front seat and, consequently, does not interfere with operation of the vehicle. The telescoping sections make the device flexible whereby it is adapted to be installed in different types of vehicles and the angle of the section 23 in relation to the base portions 10 and 17 is adapted to be adjusted to correspond with the slope of the forward section of the floor of the vehicle.

It will be understood that modifications, within the scope of the appended claims, may be made in the design and arrangement of the parts without departing from the spirit of the invention.

What is claimed is:

1. A carrying tray for a motor vehicle comprising a base having a mounting flange at one end and walls extended upwardly from the sides, a telescoping tray having side walls with beads on upper edges thereof slidably mounted on the base, said tray having an angularly disposed section extended upwardly from the extended edge, and a cover hinged to said angularly disposed section.

2. A carrying tray for a motor vehicle comprising a base having a mounting flange with openings therein at one end and walls extended upwardly from the sides, a telescoping tray having side walls with beads on upper edges thereof extended over the walls at the sides of the base whereby the tray is slidably mounted on the base, said tray having an angularly disposed section extended upwardly from the forward end and said angularly disposed section having a base with side walls and a wall extended upwardly from the forward edge, and a cover hinged to the upper edge of the wall extended upwardly from the forward edge of the base of the angularly disposed section.

3. A carrying tray for a motor vehicle comprising a base having a mounting flange with openings therein at one end and walls extended upwardly from the sides, a telescoping tray having side walls with beads on upper edges thereof extended over the walls at the sides of the base whereby the tray is slidably mounted on the base, said tray having an angularly disposed section extended upwardly from the forward end and said angularly disposed section having a base with side walls and a wall extended upwardly from the forward edge, and a cover hinged to the upper edge of the wall extended upwardly from the forward edge of the base of the angularly disposed section, one of the side walls of the angularly disposed section having a finger receiving slot therein to facilitate elevating the cover.

4. In a map and article carrying device for motor vehicles, the combination which comprises a base having a mounting flange with openings therethrough extended upwardly from one end and having walls with rolls on upper edges thereof extended upwardly from the sides, a tray having side walls with beads on upper edges positioned to slide over the walls at the sides of the base providing a telescoping connection, a base extended upwardly from the extended edge of the tray and having front and side walls extended upwardly therefrom, and a cover hinged to the upper edge of the front wall on the upwardly extended base of the tray.

References Cited in the file of this patent

UNITED STATES PATENTS

| | | |
|---|---|---|
| 1,863,368 | Folmer | June 14, 1932 |
| 2,271,884 | Blair | Feb. 3, 1942 |
| 2,353,391 | Cotton | July 11, 1944 |
| 2,530,876 | Harris | Nov. 21, 1950 |
| 2,540,392 | Haskell | Feb. 6, 1951 |
| 2,634,181 | Hunt | Apr. 7, 1953 |
| 2,657,967 | Gilchrist | Nov. 3, 1953 |